Aug. 22, 1944. R. P. LUTZ Re. 22,532

COMPOSITE INSULATING MATERIAL AND METHOD OF MAKING SAME

Original Filed Oct. 31, 1936

INVENTOR
R. P. LUTZ
BY H. A. Whitehorn
ATTORNEY

Reissued Aug. 22, 1944

Re. 22,532

UNITED STATES PATENT OFFICE 22,532

COMPOSITE INSULATING MATERIAL AND METHOD OF MAKING SAME

Raymond P. Lutz, Oak Park, Ill., assignor to Western Electric Company, Incorporated, New York, N. Y., a corporation of New York Original No. 2,172,445, dated September 12, 1939, Serial No. 108,610, October 31, 1936. Application for reissue January 28, 1943, Serial No. 473,864

8 Claims. (Cl. 154—2.6)

This invention relates to impregnated fibrous materials and compositions suitable for impregnating such materials and to methods of impregnating fibrous materials, and is a continuation in part of my copending applications, Serial No. 713,866, filed March 3, 1934, and Serial No. 752,467, filed November 10, 1934.

Objects of the invention are to provide materials having good non-hygroscopic and insulating properties for use in electrical apparatus and to provide improved compositions and methods for impregnating fibrous materials.

In accordance with one embodiment of the invention, a fibrous material suitable for filling or encasing electrical coils is impregnated with "Vinsol" or a solution of "Vinsol" and cellulose derivatives to insulate the coil and prevent corrosion of the electrical conductors.

Other objects and advantages will appear as the description proceeds.

A complete understanding of the invention may be had by reference to the following description taken in conjunction with the accompanying drawing, in which Fig. 1 is a perspective view, partly in section, of a coil embodying the invention;

Figure 1:
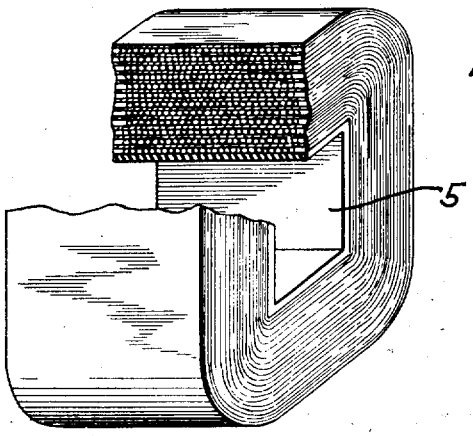

Referring more particularly to Fig. 1, the coil may be provided with a rectangular core 5 of fibrous material or the core may be made of a phenol condensation product, of cellulose acetate, or of a phenol condensation product faced with cellulose acetate. The convolutions of wire are wound in layers on the core and each layer is separated by a fibrous sheet of paper, cloth, or the like and a similar sheet is wrapped around the outer layer of wire. The wire may be bare, if suitably spaced, but preferably comprises enameled wire or wire having a fibrous insulation.

After the coil is wound, it may be immersed in a solution sold on the market under the trade-name of "Vinsol" by the Hercules Powder Company. "Vinsol" is a hard dark-colored resinous material comprising a gasoline-insoluble pine wood resin, produced by extracting resinous wood with a coal tar hydrocarbon by evaporation, extracting the residue with a petroleum hydrocarbon, removing the solvent and recovering the gasoline-insoluble resin as described in Patent No. 2,193,026, issued March 12, 1940, to Lucius C. Hall.

A solution of the Vinsol may be made by dissolving a quantity of this material in the proportion of 100 parts of the material to 75 parts by weight of acetone. The amount of solvent used is not critical, but excess solvent should be avoided as uneconomical. Such a solution has been found to have a high penetrating power and will thoroughly impregnate the fibrous material in the coil. Tests made on coils made in this manner have been found to have a very low hygroscopicity and high corrosion resistance and due to the high insulation resistance and low dielectric constant of the impregnated fibrous material, the material is excellently suited for insulating coils. For some purposes a coil made as described above may be dipped in a solution of cellulose acetate and Vinsol to provide a more elastic covering for the outside of the coil or it may be dipped in such a solution without previously dipping it in a solution of the Vinsol. It has been found that a solution of cellulose acetate in acetone by itself has poor impregnating properties since it, in effect, coats only the surface of the accessible fibers of the fibrous material. However, when the cellulose acetate is mixed with a solution of Vinsol in acetone, the cellulose acetate is dissolved, and the Vinsol serves as a carrier to carry the cellulose acetate into the fiber. The addition of the cellulose acetate to the Vinsol raises the melting point of the composition over that of the Vinsol alone and the composition containing the two ingredients is, therefore, more suitable for coils which are operated at high temperatures.

In preparing a solution of cellulose acetate and Vinsol, 100 parts of the Vinsol may be first dissolved in about 75 parts of acetone and 100 parts of cellulose acetate may be dissolved in 400 parts of acetone and the materials then mixed together, or Vinsol may be added directly to a solution of cellulose acetate in acetone.

Preferably, the cellulose acetate may constitute an amount equal to the amount of Vinsol, although these materials are soluble in all proportions. It appears that when less than 3% of Vinsol is used, the property of causing the cellulose acetate to penetrate fiber becomes negligible and when more than 95% of Vinsol is used, the product becomes brittle and tends to flake.

Vinsol alone is quite brittle and tends to become powdery when dry. However, a solution of this material with a cellulose ester makes a more plastic or less brittle material for many uses. This composition is thermoplastic and can be formed into sheets or articles in a mold under heat and pressure. The material can be prepared for molding by dissolving the ingredients in acetone, as previously described, evaporating the solvent, and pulverizing the residue into particles of suitable size. In preparing this material, a relatively viscous solution can be used to reduce the quantity of acetone required for the impregnating solution. It is also feasible to reduce this solution to sheets or molding slugs by evaporating the solvent from solution contained in forms of the proper contour. For other applications, the cellulose ester and Vinsol may be mixed in powdered form, placed in a mold, and subjected to heat and pressure to consolidate the material and form a solid solution.

The Vinsol is characterized by its insolubility in petroleum hydrocarbons and turpentines; and, therefore, coils made as described above may be used where they come in contact with lubricating oils or transformer cooling oils without impairing the effectiveness of the insulation.

Figure 2:
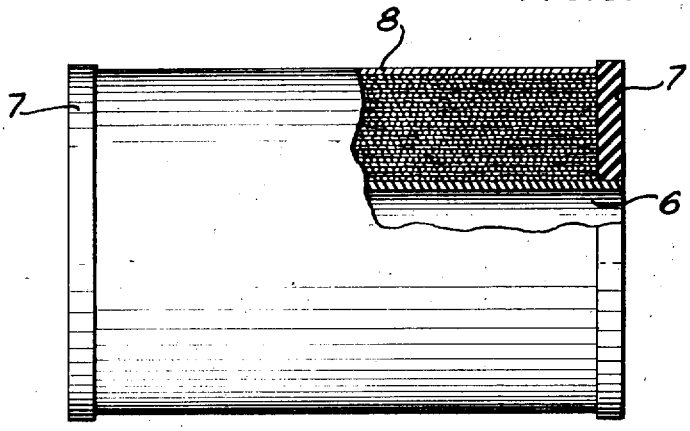
Fig. 2 is a modified form of coil embodying the invention.
Figure 3:
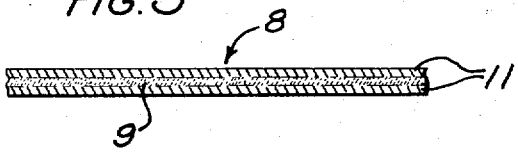
Fig. 3 is a fragmentary detail view of the covering for the coil shown in Fig. 2.

Fig. 2 illustrates a coil having a core 6 comprised of cellulose acetate or a phenol fiber condensation product faced with cellulose acetate. The coil is wound on the core in layers and the layers are separated from each other by sheets of fibrous material. After the coil has been wound, it is impregnated with a solution of Vinsol or the coil may be impregnated with a solution of Vinsol and cellulose acetate. After the coil is impregnated, heads 7 of cellulose acetate or phenol fiber faced with cellulose acetate are adhered to the core by applying a solution of cellulose acetate in acetone to the ends of the core and pressing the head against the core until the solvent dries. If it is desired to have a hermetically sealed coil, an outer sheet 8 may be applied to the coil. This sheet is made by impregnating a fibrous sheet 9 with Vinsol or a solution of Vinsol and cellulose acetate and then applying a sheet 11 of cellulose acetate to each face of the impregnated sheet 9. The cellulose acetate sheets may be adhered to the impregnated sheet 9 by subjecting the composite sheet to heat and pressure to plasticize the cellulose acetate and mold it integral with the impregnated fibrous sheet. This procedure insures thorough impregnation of the fibrous material so that when the sheet is cut, it will not expose the raw or unimpregnated fiber. In covering a coil, as shown in Fig. 2, a piece of this composite sheet is cut so that its edges will overlap when wound about the coil and the ends will abut the heads 7. A solution of cellulose acetate in acetone may then be applied between the overlapping edges and along the ends where they abut the heads to completely and hermetically seal the coil.

While the invention has been described in connection with particular embodiments thereof, it will be understood that many changes and modifications may be made without departing from the spirit and scope of the invention.

What is claimed is:

1. An insulating material comprising a fibrous sheet impregnated with a composition of cellulose acetate and an alcohol-soluble resin having a methoxy content of about 3% to about 6% which is extracted from pine wood with a coal tar hydrocarbon and from which resin has been extracted with a light petroleum hydrocarbon, said fibrous sheet having a sheet of cellulose acetate adhered to one face thereof to form a composite sheet.

2. A method of making an insulating material which comprises adhering a sheet of cellulose acetate to one face of a composition comprising a fibrous material impregnated with cellulose acetate and with a resin which is the residue formed by extracting pine wood with a coal tar hydrocarbon, evaporating the coal tar hydrocarbon and other volatile constituents from the extract to produce a solid residue, extracting rosin from said residue with a light petroleum hydrocarbon, and separating the rosin extract from the remaining residue, which is substantially insoluble, in light petroleum hydrocarbons and recovering the remaining residue.

3. A method of making an insulating material which comprises impregnating fibrous material with cellulose acetate and an alcohol-soluble resin which is the residue produced by steaming pine wood chips to remove volatile substances therefrom, extracting the steamed wood chips with a coal tar hydrocarbon, evaporating the coal tar hydrocarbon and other volatile constituents of the extract from the extract to produce a solid residue, extracting rosin from said residue with a light petroleum hydrocarbon, and separating the extract from the light petroleum hydrocarbon-insoluble components of the original extraction of pine wood, applying a sheet of cellulose acetate to one face of the thus impregnated fibrous material, and adhering the cellulose acetate sheet to the impregnated fibrous material with heat and pressure.

4. A method of making an insulating material which comprises impregnating a fibrous material with a mixture of a cellulose derivative and a resin which is soluble in alcohol and substantially insoluble in light petroleum hydrocarbons and which is produced by extracting pine wood with a coal tar hydrocarbon to produce an extract containing coal tar hydrocarbons, volatile materials such as turpentine, and normally solid resinous materials, evaporating the coal tar hydrocarbon and volatile portions of the extract to produce a solid residue, extracting rosin from said residue with a light petroleum hydrocarbon, separating the said rosin extract from the then remaining insoluble residue and recovering the said insoluble residue which has the aforesaid and desired characteristics, and applying a sheet of cellulose derivative to one face of the impregnated fibrous material, and adhering the sheet of cellulose derivative to the fibrous material with heat and pressure.

5. A method of making an insulating material which comprises impregnating a fibrous material with a mixture of cellulose acetate and a resin which is substantially insoluble in light petroleum hydrocarbons and which has a methoxy content of between about 3% to about 6%, which resin is produced by extracting pine wood with a coal tar hydrocarbon to produce an extract containing coal tar hydrocarbon, other volatile substances such as turpentine and pine oil, rosin, and a solid residue, removing the coal tar hydrocarbon and other volatile materials to produce a mixture of rosin and said solid residue, extracting rosin from said mixture with a light petroleum hydrocarbon, and separating said rosin extract from said solid residue which has the aforesaid and desired characteristics, applying a sheet of cellulose acetate to one face of the impregnated fibrous material, and adhering the cellulose acetate sheet to the fibrous material with heat and pressure.

6. A method of making an insulating material which comprises impregnating a fibrous material with a cellulose derivative and a resin which is characterized by a freedom from wood rosin, solubility in alcohol, substantial insolubility in gasoline, a methoxy content of about 3% to about 6%, an acid number of 100, a naphtha insolubility of about 98% and a melting point of about 125° C., which rosin may be produced by extracting pine wood with a coal tar hydrocarbon, evaporating the coal tar hydrocarbon and other volatile constituents of the extract from the extract to produce a solid residue, extracting rosin from said residue with a light petroleum hydrocarbon, and separating the rosin extract from the remaining residue which is substantially insoluble in light petroleum hydrocarbons and recovering the remaining residue which has the aforesaid and desired characteristics, assembling a sheet of cellulose acetate to one face of the impregnated material, and applying heat and pressure to the assembly to form the cellulose acetate sheet and impregnated material into a composite sheet.

7. A method of making an insulating material which comprises impregnating a fibrous material with cellulose acetate and a resin produced by extracting pine wood with a coal tar hydrocarbon to produce an extract containing coal tar hydrocarbon, other volatile substances such as turpentine and pine oil, rosin, and a solid residue, removing the coal tar hydrocarbon and other volatile materials to produce a mixture of rosin and said solid residue, extracting rosin from said mixture with a light petroleum hydrocarbon, and separating said rosin extract from said solid residue which has the aforesaid and desired characteristics, assembling a sheet of cellulose acetate to one face of the impregnated material, and applying heat and pressure to the assembly to form the cellulose acetate and impregnated material into a composite sheet.

8. An insulating material comprising a sheet of cellulose acetate and an impregnated sheet adhered to one face of the cellulose acetate sheet to form a composite sheet, said impregnated sheet comprising a fibrous mass impregnated with a cellulose derivative and a resin characterized by freedom from wood rosin, solubility in alcohol, substantial insolubility in gasoline, a methoxy content of about 3% to about 6%, an acid number of about 100, a naphtha insolubility of about 98%, and a melting point of about 125° C., which resin is produced by extracting pine wood with a coal tar hydrocarbon, evaporating the coal tar hydrocarbon and other volatile constituents of the extract from the extract to produce a solid residue, extracting rosin from said residue with a light petroleum hydrocarbon, and separating the rosin extract from the remaining residue which is substantially insoluble in light petroleum hydrocarbons and recovering the remaining residue which has the aforesaid and desired characteristics.

RAYMOND P. LUTZ.

CERTIFICATE OF CORRECTION.

Reissue No. 22,532. August 22, 1944.

RAYMOND P. LUTZ.

It is hereby certified that error appears in the printed specification of the above numbered patent requiring correction as follows: Page 1, first column, line 52, after "carbon," strike out the words "removing the solvent" and insert the same after "hydrocarbon" in line 50, same page and column; and that the said Letters Patent should be read with this correction therein that the same may conform to the record of the case in the Patent Office.

Signed and sealed this 20th day of March, A. D. 1945.

Leslie Frazer (Seal) Acting Commissioner of Patents.

solubility in alcohol, substantial insolubility in gasoline, a methoxy content of about 3% to about 6%, an acid number of 100, a naphtha insolubility of about 98% and a melting point of about 125° C., which rosin may be produced by extracting pine wood with a coal tar hydrocarbon, evaporating the coal tar hydrocarbon and other volatile constituents of the extract from the extract to produce a solid residue, extracting rosin from said residue with a light petroleum hydrocarbon, and separating the rosin extract from the remaining residue which is substantially insoluble in light petroleum hydrocarbons and recovering the remaining residue which has the aforesaid and desired characteristics, assembling a sheet of cellulose acetate to one face of the impregnated material, and applying heat and pressure to the assembly to form the cellulose acetate sheet and impregnated material into a composite sheet.

7. A method of making an insulating material which comprises impregnating a fibrous material with cellulose acetate and a resin produced by extracting pine wood with a coal tar hydrocarbon to produce an extract containing coal tar hydrocarbon, other volatile substances such as turpentine and pine oil, rosin, and a solid residue, removing the coal tar hydrocarbon and other volatile materials to produce a mixture of rosin and said solid residue, extracting rosin from said mixture with a light petroleum hydrocarbon, and separating said rosin extract from said solid residue which has the aforesaid and desired characteristics, assembling a sheet of cellulose acetate to one face of the impregnated material, and applying heat and pressure to the assembly to form the cellulose acetate and impregnated material into a composite sheet.

8. An insulating material comprising a sheet of cellulose acetate and an impregnated sheet adhered to one face of the cellulose acetate sheet to form a composite sheet, said impregnated sheet comprising a fibrous mass impregnated with a cellulose derivative and a resin characterized by freedom from wood rosin, solubility in alcohol, substantial insolubility in gasoline, a methoxy content of about 3% to about 6%, an acid number of about 100, a naphtha insolubility of about 98%, and a melting point of about 125° C., which resin is produced by extracting pine wood with a coal tar hydrocarbon, evaporating the coal tar hydrocarbon and other volatile constituents of the extract from the extract to produce a solid residue, extracting rosin from said residue with a light petroleum hydrocarbon, and separating the rosin extract from the remaining residue which is substantially insoluble in light petroleum hydrocarbons and recovering the remaining residue which has the aforesaid and desired characteristics.

RAYMOND P. LUTZ.

CERTIFICATE OF CORRECTION.

Reissue No. 22,532. August 22, 1944.

RAYMOND P. LUTZ.

It is hereby certified that error appears in the printed specification of the above numbered patent requiring correction as follows: Page 1, first column, line 52, after "carbon," strike out the words "removing the solvent" and insert the same after "hydrocarbon" in line 50, same page and column; and that the said Letters Patent should be read with this correction therein that the same may conform to the record of the case in the Patent Office.

Signed and sealed this 20th day of March, A. D. 1945.

Leslie Frazer (Seal) Acting Commissioner of Patents.